United States Patent
Ogino et al.

(10) Patent No.: US 6,767,061 B2
(45) Date of Patent: Jul. 27, 2004

(54) SEAT FOR VEHICLE USE

(75) Inventors: Takashi Ogino, Okazaki (JP); Shingo Kutomi, Nishikamo-gun (JP); Katsuhiko Sasaki, Akishima (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/268,018

(22) Filed: Oct. 9, 2002

(65) Prior Publication Data

US 2003/0085602 A1 May 8, 2003

(30) Foreign Application Priority Data

Oct. 10, 2001 (JP) ........................................ 2001-312662

(51) Int. Cl.[7] ................................................. B60N 2/02
(52) U.S. Cl. ...................... 297/313; 297/331; 297/335; 297/337
(58) Field of Search ............................... 297/313, 331, 297/332, 335, 337

(56) References Cited

U.S. PATENT DOCUMENTS

| 920,542 A | * | 5/1909 | Clark | 297/332 |
| 4,793,649 A | * | 12/1988 | Yamano et al. | 296/65.09 |
| 5,156,438 A | * | 10/1992 | Hayakawa et al. | 297/335 |
| 5,328,239 A | * | 7/1994 | Yamazaki | 297/333 |
| 5,529,378 A | * | 6/1996 | Chaban et al. | 297/331 |
| 6,012,771 A | * | 1/2000 | Shea | 297/216.1 |
| 6,186,572 B1 | * | 2/2001 | Oh | 296/65.05 |

FOREIGN PATENT DOCUMENTS

| DE | 199 43 454 C1 | | 1/2001 |
| GB | 2 337 925 A | | 12/1999 |
| GB | 2 372 438 A | | 8/2002 |
| JP | 55164531 A | * | 12/1980 |
| JP | 11-91422 A | | 4/1999 |

* cited by examiner

Primary Examiner—Peter M. Cuomo
Assistant Examiner—Joseph Edell
(74) Attorney, Agent, or Firm—Rossi & Associates

(57) ABSTRACT

A seat for vehicle use, the front portion of which is capable of tipping up. The seat includes a seat back, a seat cushion, a tip-up unit which tips up a forward end side of the seat cushion from a base position to an upward tip-up position, and a rock unit which holds the seat cushion at at least one position between the base position and the tip-up position. The seat cushion includes a front seat cushion positioned at a front side of a vehicle and a rear seat cushion positioned at the rear of the front seat cushion. The front seat cushion is provided with the tip-up unit. The rock unit includes a first gear and a second gear both mutually engaged so as to permit tip-up motion of the seat cushion and restrict the tip-down motion of the seat cushion.

9 Claims, 10 Drawing Sheets

SEAT FOR VEHICLE USE

BACKGROUND OF THE INVENTION

1. Field of the Invention

The present invention relates to a seat for vehicle use, the front portion of which is capable of tipping up.

2. Background Art

Conventionally, a tip-up seat, which is arranged in a rear seat of an automobile, has been put into practical use in which the front end portion of a seat cushion can be held at a tip-up position. In this type tip-up seat, the seat cushion is rotated to the tip-up position around the rear end of the seat cushion. Under the above condition, the whole seat is slid to the front. In this way, the volume of a baggage room can be extended and a large quantity of baggage can be loaded. In this connection, in general, when a distance from the floor of a vehicle to the seat face of a seat cushion is not sufficiently long, the thigh support function of supporting the knee of a passenger is lowered. Accordingly, there is a demand of enhancing the thigh support function so that the passenger can comfortably drive the vehicle.

In order to solve the above problems, Japanese Unexamined Patent Publication No. 11-91422 discloses the following technique. There is provided a seat cushion which is divided into two portions of a rear and a front cushion. The front cushion is capable of tipping up with respect to the rear cushion via a rock device, and the rear cushion is held on a base.

However, this technique is developed on the assumption that the space formed between the seat cushion and the seat back is used as a space into which baggage is put and no consideration is given to the thigh support function. Therefore, it is impossible for the above technique to meet the demand described above.

SUMMARY OF THE INVENTION

The present invention has been accomplished to solve the above problems. It is an object of the present invention to provide a seat for vehicle use characterized in that the thigh support function can be enhanced by utilizing a tip-up function of a simple structure.

A seat for vehicle use according to the invention comprises a seat back, a seat cushion, a tip-up unit which tips up a forward end side of the seat cushion from a base position to an upward tip-up position, and a rock unit which holds the seat cushion at a position between the base position and the tip-up position.

According to the invention, the seat cushion includes a front seat cushion positioned at a front side of a vehicle and a rear seat cushion positioned at the rear of the front seat cushion; and the front seat cushion is provided with the tip-up unit.

According to the invention, the longest distance in the longitudinal direction of the vehicle from the tip-up unit to the rear end portion of the front seat cushion is shorter than the distance in the vertical direction of the vehicle from the tip-up unit to a floor of the vehicle.

According to the invention, the boundary between the front seat cushion and the rear seat cushion is located in the vicinity of a portion right below the lower end portion of the seat back on the front side.

According to the invention, the rock unit permits a tip-up motion of the seat cushion in a direction to the tip-up position and restricts a tip-down motion of the seat cushion in a direction to the base position.

According to the invention, the rock unit includes a first gear and a second gear, the second gear fixed to the seat cushion; the second gear is capable of moving along the first gear according to the tip-up motion of the seat cushion while engaging with the first gear; and the first gear and the second gear are mutually engaged so as to restrict the tip-down motion of the seat cushion.

According to the invention, the rock unit is disposed at a position in the vehicle more forward than the position of the tip-up unit.

According to the invention, the rock unit includes a first gear and a second gear, the second gear fixed to the seat cushion; and the second gear is capable of moving along the first gear according to a movement of the seat cushion from the base position to the upward tip-up position while engaging with the first gear at a plurality of different positions.

According to the invention, the seat for vehicle use further comprises a disengagement unit for disengaging the first gear and the second gear.

DETAILED DESCRIPTION OF THE PREFERRED EMBODIMENTS

Figure 1:
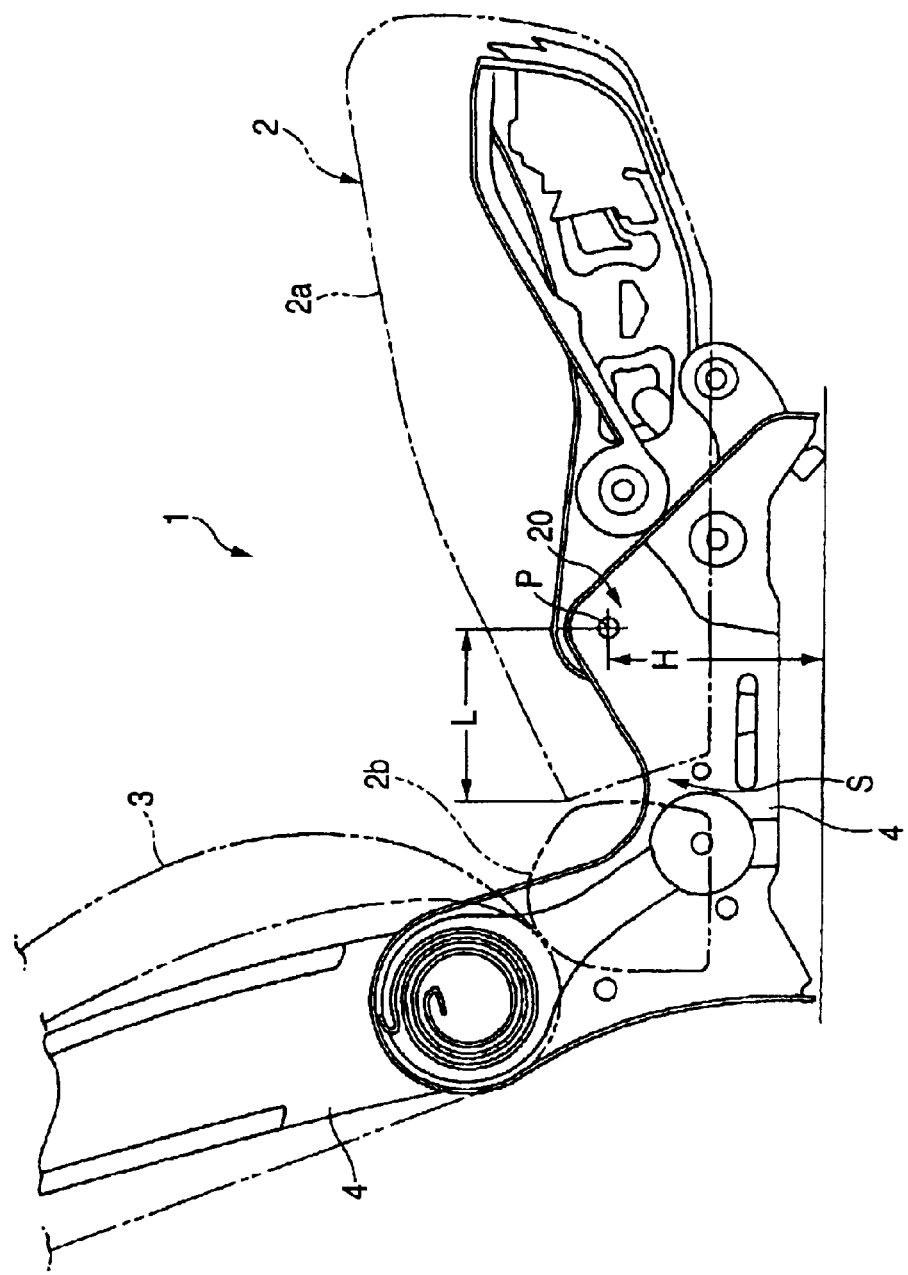
FIG. 1 is a side view schematically showing a seat for vehicle use of an embodiment of the present invention.

Referring to the accompanying drawings, an embodiment of the seat for vehicle use of the present invention will be explained as follows. As shown in FIG. 1, the seat 1 includes a seat cushion 2 and seat back 3. These seat cushion 2 and seat back 3 are attached to the seat frame 4.

The seat cushion 2 is divided into two portions in the longitudinal direction. Therefore, the seat cushion 2 is composed of a front seat cushion 2a on the front side of a vehicle and a rear seat cushion 2b on the rear side. In this case, the front seat cushion 2a is provided with a rotary mechanism 20 including a tip-up unit and rotary mechanism. Therefore, the front seat cushion 2a is capable of rotating around point P. In this connection, this rotary mechanism 20 is a common one point hinge mechanism, in which the front seat cushion 2a is pivotally supported by the seat frame 4 at point P.

Longest distance L in the longitudinal direction of the vehicle from rotary center P of the seat cushion 2a to the rear end portion of the seat cushion 2a is shorter than distance H in the vertical direction of the vehicle from rotary center P to the floor (not shown) of the vehicle. Due to the above structure, the rear end portion of the seat cushion 2a and the floor of the vehicle do not interfere with each other when the seat cushion 2a is rotated.

Splitting face S, on which the front and the rear portion of the seat cushion 2 are split from each other, is located in the neighborhood of a position right below the lower end portion on the front face side of the seat back 3. Due to the above structure, splitting face S seldom interferes with the passenger's seating position. Therefore, the passenger feels no sense of incongruity and no comfortableness is hurt.

The front seat cushion 2a has a tilt-up function of fixing the seat cushion 2a at a predetermined angle so as to enhance the thigh support function and the tip-up function of fixing the seat cushion 2a after it has been tipped up.

Figure 2:
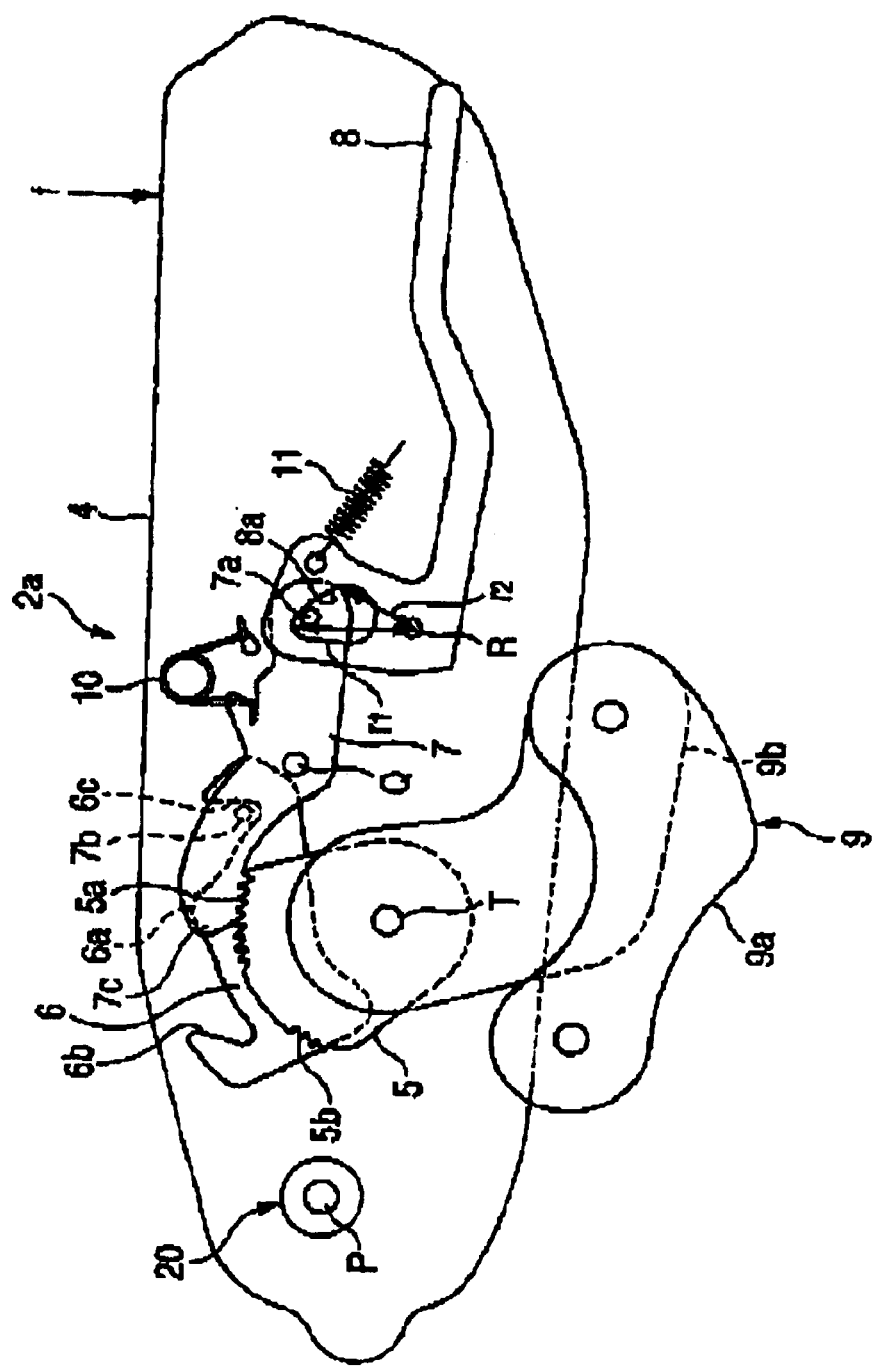
FIG. 2 is a side view schematically showing a structure of a primary portion of a seat for vehicle use of an embodiment of the present invention.
Figure 3:
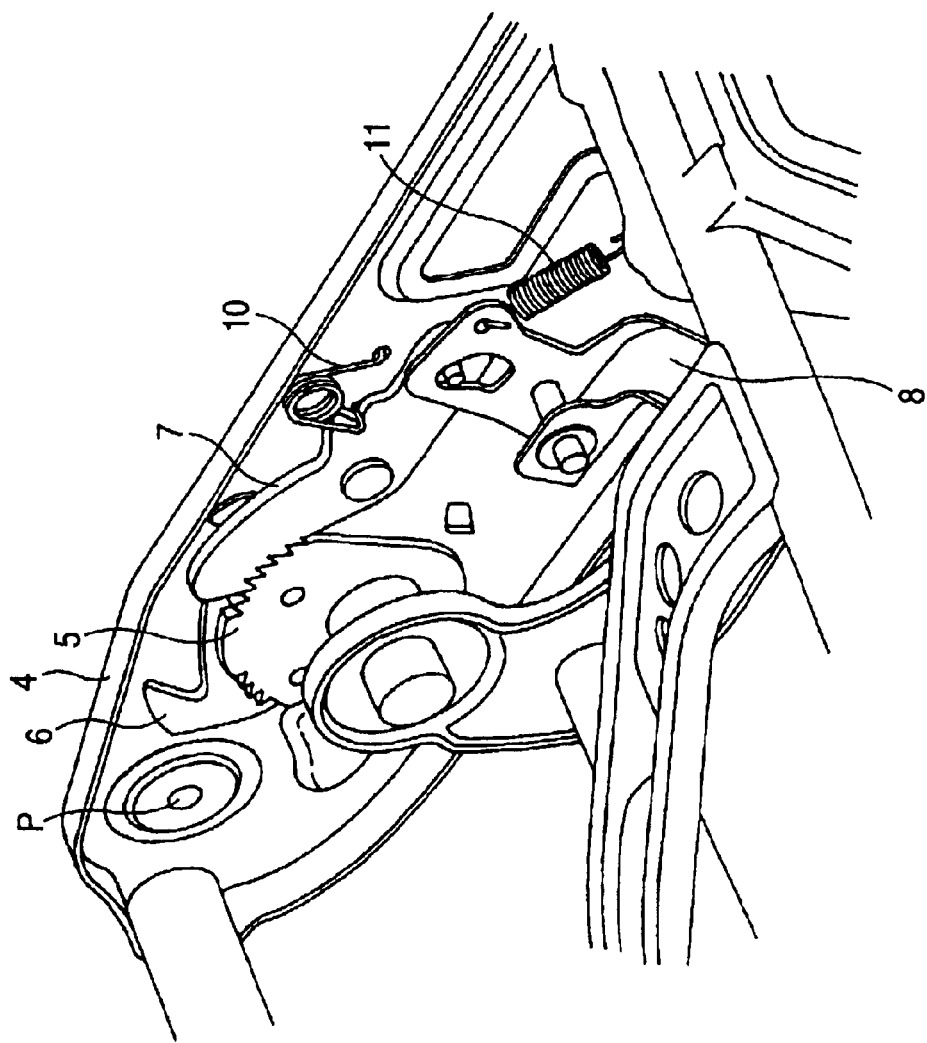
FIG. 3 is a perspective view schematically showing a structure of a primary portion of a seat for vehicle use of an embodiment of the present invention.

Explanations will be made into a structure for realizing the tilt-up function and tip-up function. As shown in FIGS. 2 and 3, inside the seat frame 4, there are respectively provided a sector gear (second gear) 5, guide plate 6, rock gear (first gear) 7 and tip-up lever 8.

The sector gear 5 is provided in such a manner that it can be rotated relatively with the seat frame 4. When the seat cushion 2a and seat frame 4 are rotated around point P, the sector gear 5 is rotated relatively with the frame 4 while an angle of the sector gear 5 with respect to the vehicle is being kept at a substantial constant value.

In this structure, the sector gear 5 is connected with the vehicle floor via the link mechanism 9 and seat upper rail bracket (not shown). This link mechanism 9 is provided with a first arm 9a and second arm 9b. One end of the first arm 9a is pivotally connected with the seat upper rail bracket of the vehicle, and the other end portion is pivotally connected with one end of the second arm 9b. The other end of the second arm 9b is connected with rotary center T of the sector gear 5 so that the second arm 9b can be rotated with respect to the seat frame 4. The second arm 9b and the sector gear 5 are fixed to each other, and the second arm 9b and the sector gear 5 are operated integrally with each other.

Due to the above structure of the link mechanism 9, as shown in FIGS. 4 to 7, even when the seat cushion 2a is rotated, an angle of the sector gear 5 with respect to the vehicle (floor) can be kept substantially constant.

As shown in FIG. 2, teeth 7c are formed at one end of the rock gear 7. These teeth 7c of the rock gear 7 are meshed with the teeth 5a, 5b formed in the sector gear 5. This rock gear 7 is attached to the seat frame 4 so that it can be relatively rotated around point Q. When the tip-up lever 8 described later is operated, an engaging state of the teeth 7c of the rock gear 7 with the teeth 5a, 5b of the sector gear 5 can be released from each other.

Between the rock gear 7 and the seat frame 4, there is provided a spring 10. In this case, a direction of the pushing force of the spring 10 acting on the rock gear 7 changes according to the state of the rock gear 7. In the state shown in FIG. 2, a pushing force acts on the rock gear 7 counterclockwise, so that the rock gear 7 and the sector gear 5 can be engaged with each other. On the other hand, when the rock gear 7 is rotated clockwise by the tip-up lever 8 resisting a pushing force of the spring 10, a direction of the spring force is reversely changed from the direction in which the rock gear 7 is rotated counterclockwise to the direction in which the rock gear 7 is rotated clockwise when a rotation of the rock gear 7 exceeds a certain angle, and the rock gear 7 is not engaged with the sector gear 5.

Figure 9:
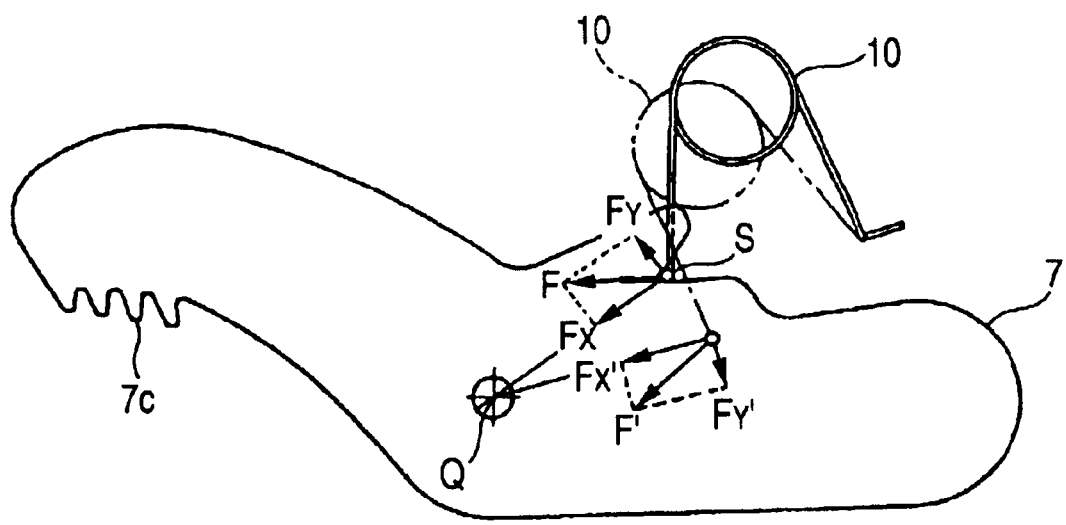
FIG. 9 is a view for explaining operation of a spring acting on a rock gear of a seat for vehicle use of an embodiment of the present invention.

This will be briefly explained below referring to FIG. 9. Pushing force F of the spring 10 is decomposed to component Fx, which is a component in the direction of a straight line connecting point S of application of the spring 10 with rotary center Q of the rock gear 7, and component Fy which is perpendicular to component Fx. In this case, component Fy acts as moment to rotate the rock gear 7 counterclockwise. However, when the rock gear 7 is rotated clockwise around point Q in the state shown in the drawing, component Fy is gradually reduced, and finally component Fy becomes zero, that is, Fy=0.

After that, component Fy acts in the opposite direction as shown by Fy' in the drawing. Therefore, moment to rotate the rock gear 7 clockwise is generated. Accordingly, when the rock gear 7 exceeds a position where Fy=0, the rock gear 7 is given a force to rotate it clockwise, and an engagement of the rock gear 7 with the sector gear 5 can be released.

On the other hand, as shown in FIG. 2, the teeth formed in the outer circumferential edge portion of the sector gear 5 are composed of teeth 5a for tilting up and teeth 5b for tipping up. In this case, the teeth 5a for tilting up are formed on the front side of the outer circumference of the sector gear 5, and the teeth 5b for tipping up are formed on the rear side of the outer circumference of the sector gear 5. In this connection, as shown in the drawing, no teeth are formed between the two portions of the teeth 5a and 5b.

Figure 5:
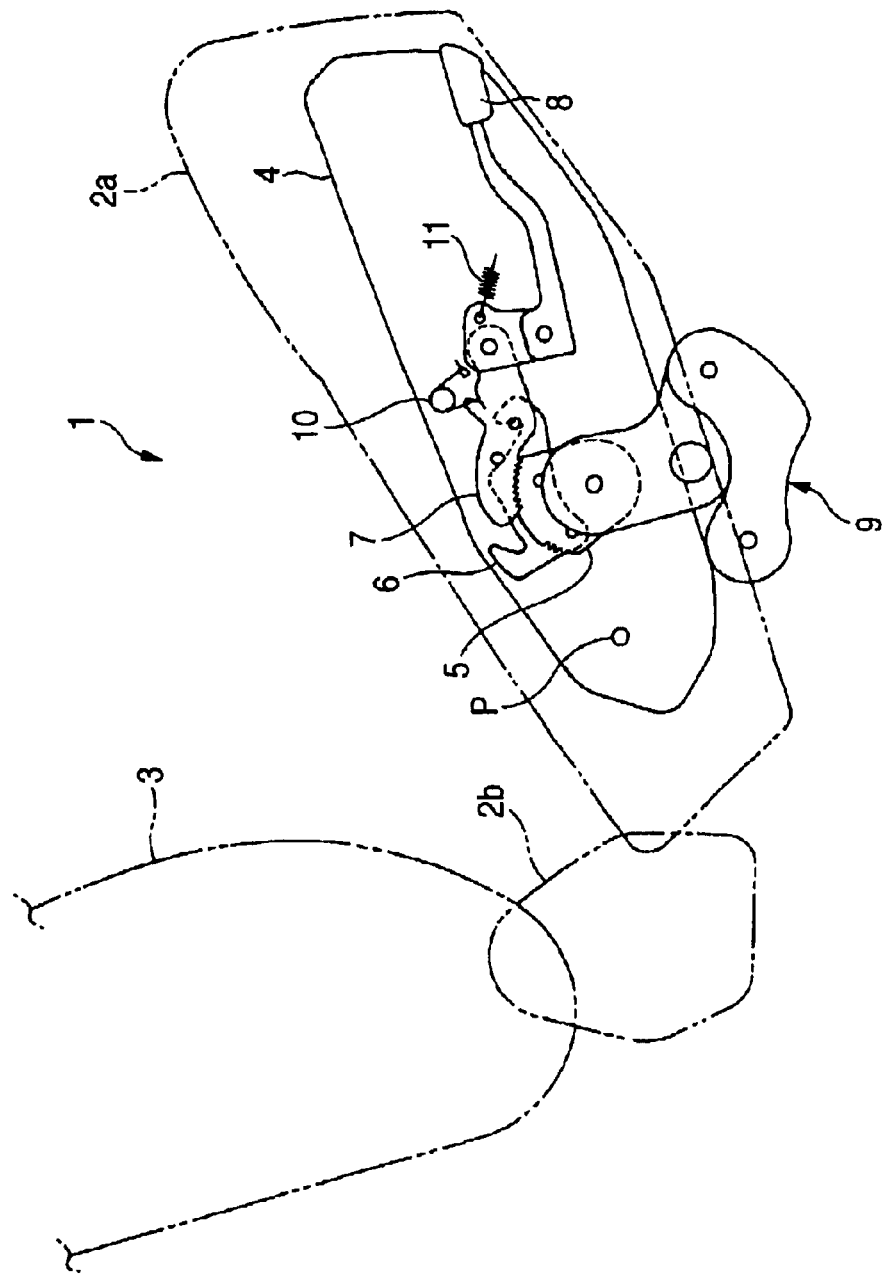
FIG. 5 is a view showing an action of a seat for vehicle use of an embodiment of the present invention.

As shown in FIG. 5, when the seat cushion 2a is rotated around point P, the teeth 7c of the rock gear 7 get over the teeth 5a of the sector gear 5 one by one, so that a state of engagement of the rock gear 7 with the sector gear 5 can be changed. In this connection, the teeth of the rock gear 7 and sector gear 5 are respectively inclined. Therefore, unless an engagement state of the rock gear 7 with the sector gear 5 is released, the teeth 7c of the rock gear 7 do not get over the teeth 5a of the sector gear 5a in the opposite direction.

Due to the above structure, a rotation of the seat cushion 2a to the tip-up position is permitted, and on the other hand a rotation of the seat cushion 2a in the direction of the downward position (referred to as a seating position) is regulated.

Accordingly, when a forward end portion of the seat cushion 2a is lifted up, the seat cushion 2a is gradually tilted up, so that the thigh support function of supporting the thigh of a passenger can be enhanced. In this connection, as shown in the drawing, the tilt-up motion can be changed in four stages in this embodiment.

Figure 6:
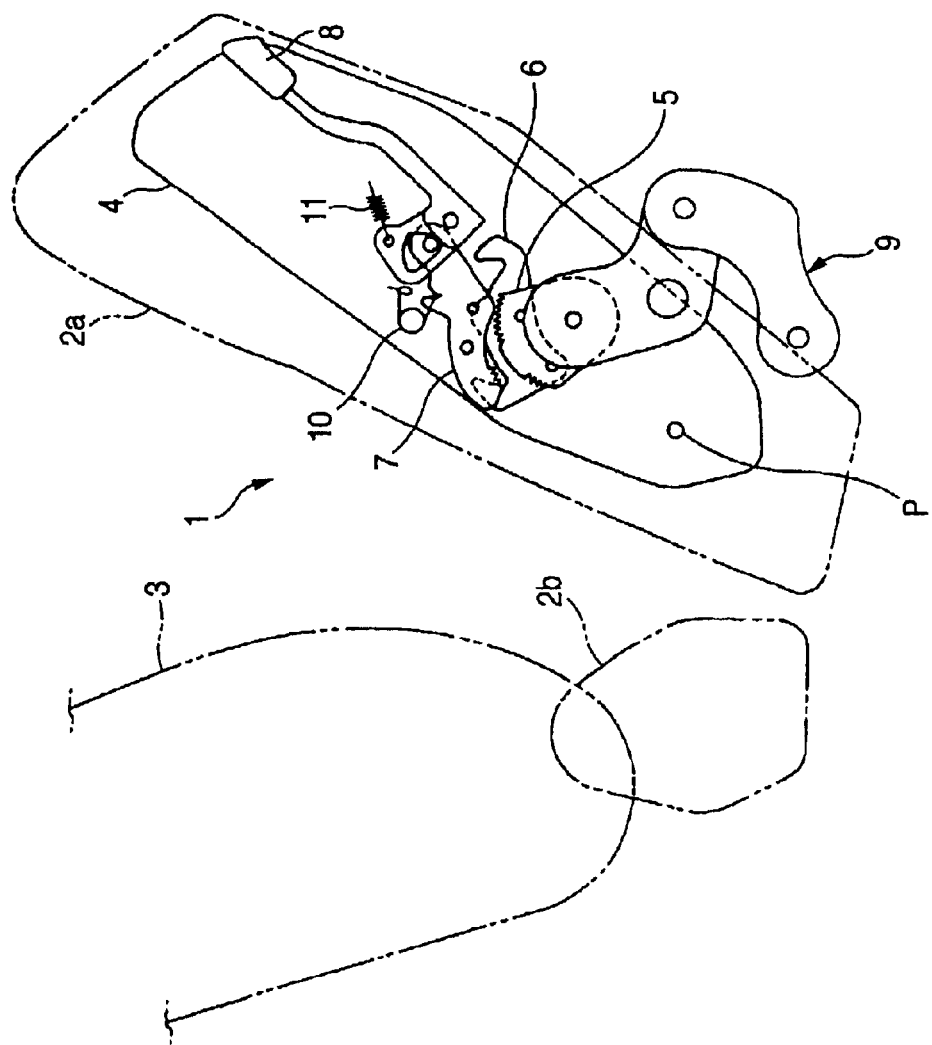
FIG. 6 is a view showing an action of a seat for vehicle use of an embodiment of the present invention.

In this connection, as shown in FIG. 2, the pin 7b is protruded from one end side (rear end side of the vehicle) of this rock gear 7, and the guide plate 6 is fixed to the sector gear 5. When the seat cushion 2a is tilted up, the pin 7b is moved along this guide plate 6. When the teeth 7c of the rock gear 7 come close to a portion in which no teeth of the sector gear 5 are formed, the pin 7b is gradually pushed upward by the protruding portion 6a formed on the guide plate 6. As described above, in this case, a direction of the pushing force of the spring 10 is inverted, and as shown in FIG. 6, an engagement of the rock gear 7 with the sector gear 5 is released, and at the same time the rock gear 7 is held in this state.

Accordingly, when the seat cushion 2a is rotated twice after the seat cushion 2a has been tilted up, the rock gear 7 is pushed up. Therefore, the seat cushion 2a can be smoothly rotated without being given any resistance.

The groove portion 6b is formed at the rear of the guide plate 6. When it comes to a tip-up position at which a seat face of the seat cushion 2a substantially becomes vertical, the pin 7b of the rock gear 7 is moved along this groove portion 6b, and the teeth 7c of the rock gear 7 are meshed with the teeth 5b for tipping up of the sector gear 5. At this time, a pushing force of the spring 10 acts in a direction so that the rock gear 7 can be pressed against the sector gear 5. Therefore, the rock gear 7 and the sector gear 5 can be kept in an engagement state.

Accordingly, when the seat cushion 2a is rotated to a predetermined tip-up position, the rock gear 7 and the sector gear 5 are meshed with each other again, so that the seat cushion 2a can be fixed at the tip-up position.

Figure 8:
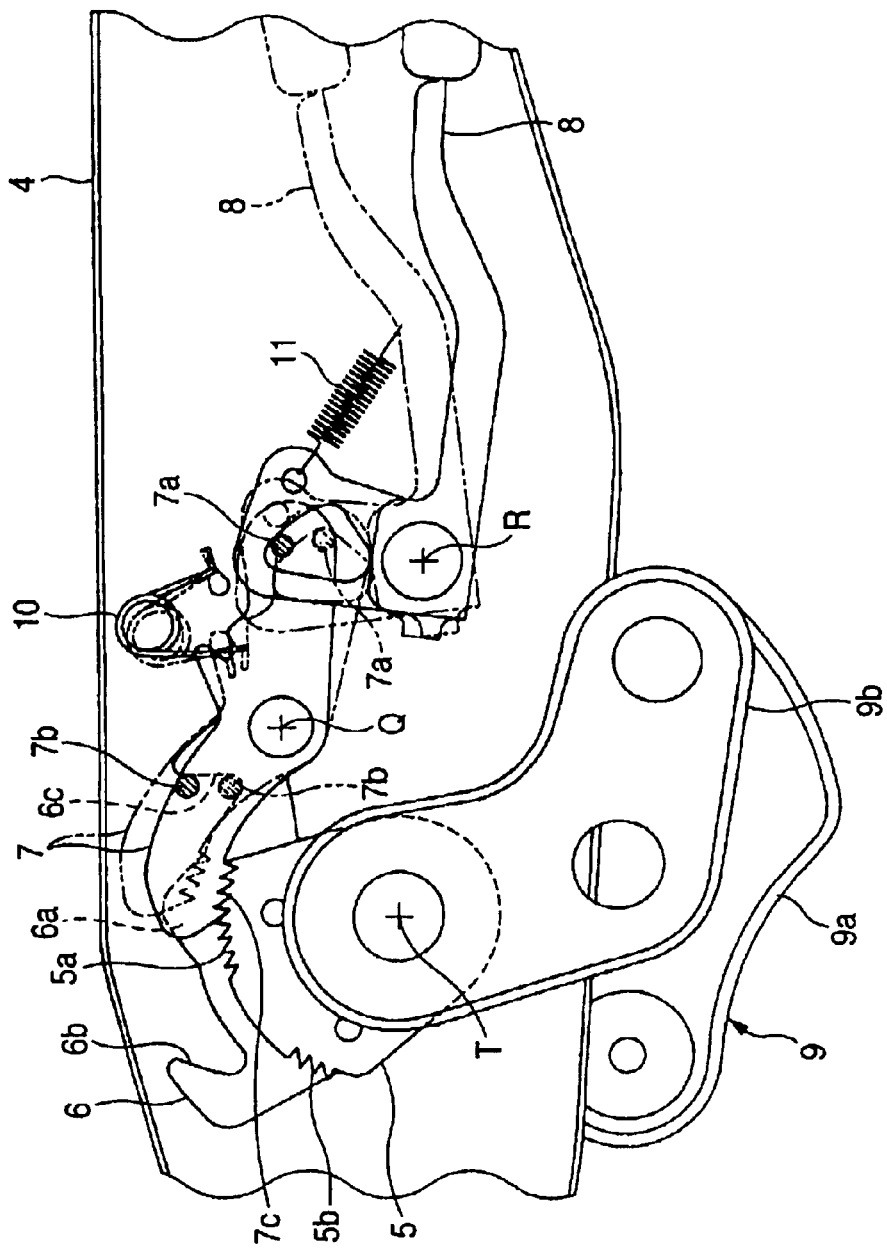
FIG. 8 is a view showing a motion of a rock gear of a seat for vehicle use of an embodiment of the present invention.

In this connection, as shown in FIGS. 2 and 8, the pin 7a is protruded from the other end side (front side of the vehicle) of the rock gear 7. This pin 7a comes into contact with an edge of the hole 8a formed in the tip-up lever 8. A forward end portion of the tip-up lever 8 is located at the front end lower portion of the seat cushion 2a. When the forward end portion of the tip-up lever 8 is lifted up, the tip-up lever 8 is rotated around point R in FIGS. 2 and 8. In this connection, the spring 11 is interposed between the tip-up lever 8 and the seat frame 4. By a pushing force generated by this spring 11, a downward force is usually given to the forward end portion of the tip-up lever 8.

An edge portion of the hole 8a is formed in the tip-up lever 8 in such a manner that a distance from rotary center R of the lever 8 to the edge portion of the hole 8a is not constant. As shown in FIG. 1, when the tip-up lever 8 is lifted and rotated, the distance from rotary center R of the lever 8 to the edge portion of the hole 8a is reduced. That is, as shown in FIG. 2, a profile of the edge portion of the hole 8a is determined so that an equality r1>r2 can be satisfied.

Due to the above structure, when the tip-up lever 8 is lifted and rotated, the pin 7a is moved downward along the edge portion of the hole 8a of this tip-up lever 8, so that the rock gear 7 is rotated around point Q and the rock gear 7 is released from the sector gear 5 by the action of the spring 10.

Accordingly, when the tip-up lever 8 is lifted and the rock gear 7 is released, the seat cushion 2a can be easily returned to the seating position from the states of tilt-up and tip-up.

In this connection, the groove 6c is formed at the forward end of the guide plate 6. When the seat cushion 2a returns to the seating position, the pin 7b of the rock gear 7 is moved along this groove 6c. Therefore, as shown in FIG. 2, the rock gear 7 and the sector gear 5 are meshed with each other.

Figure 4:
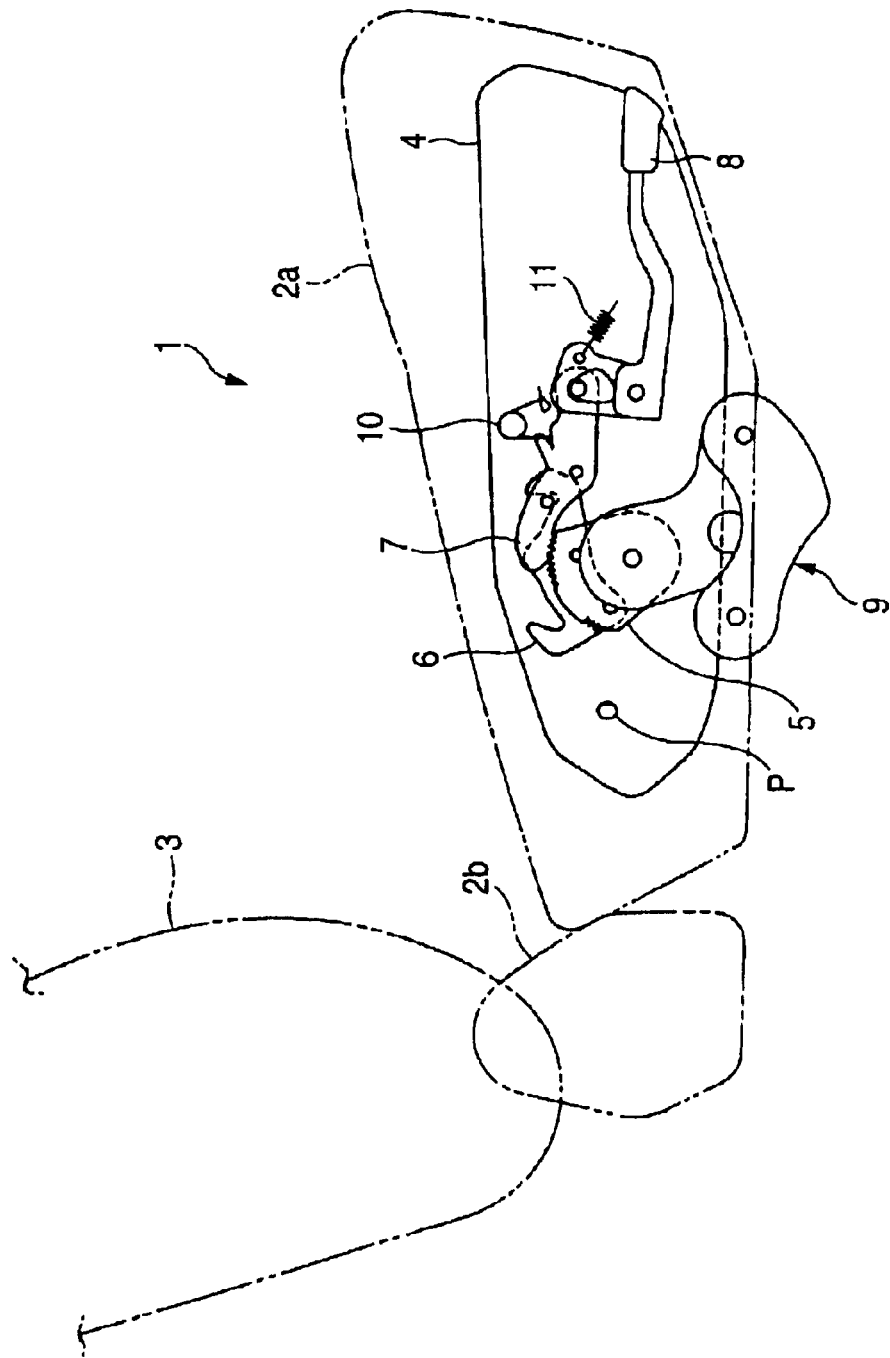
FIG. 4 is a view showing an action of a seat for vehicle use of an embodiment of the present invention.

The seat for vehicle use of an embodiment of the present invention is composed as described above. Therefore, when the seat is set at a usual seating position, the teeth 7c of the rock gear 7 and the teeth 5a of the sector gear 5 are meshed with each other as shown in FIG. 4.

When the seat cushion 2a is tilted up, the forward end of the seat cushion 2a is lifted and the seat cushion 2a is rotated around point P. Due to the foregoing, the teeth 7c of the rock gear 7 get over the teeth 5a of the sector gear 5, and the seat cushion 2a can be fixed at a predetermined position in a plurality of stages (tilt-up function).

Accordingly, it is possible for a passenger to tilt up the seat cushion 2a to his favorite position, which enhances the thigh support property of the seat.

When the seat cushion 2a is further rotated in the above condition, the pin 7b is pushed upward by the ridge portion 6a of the guide plate 6, and the rock gear 7 and the sector gear 5 are released from each other as shown in FIG. 6.

Figure 7:
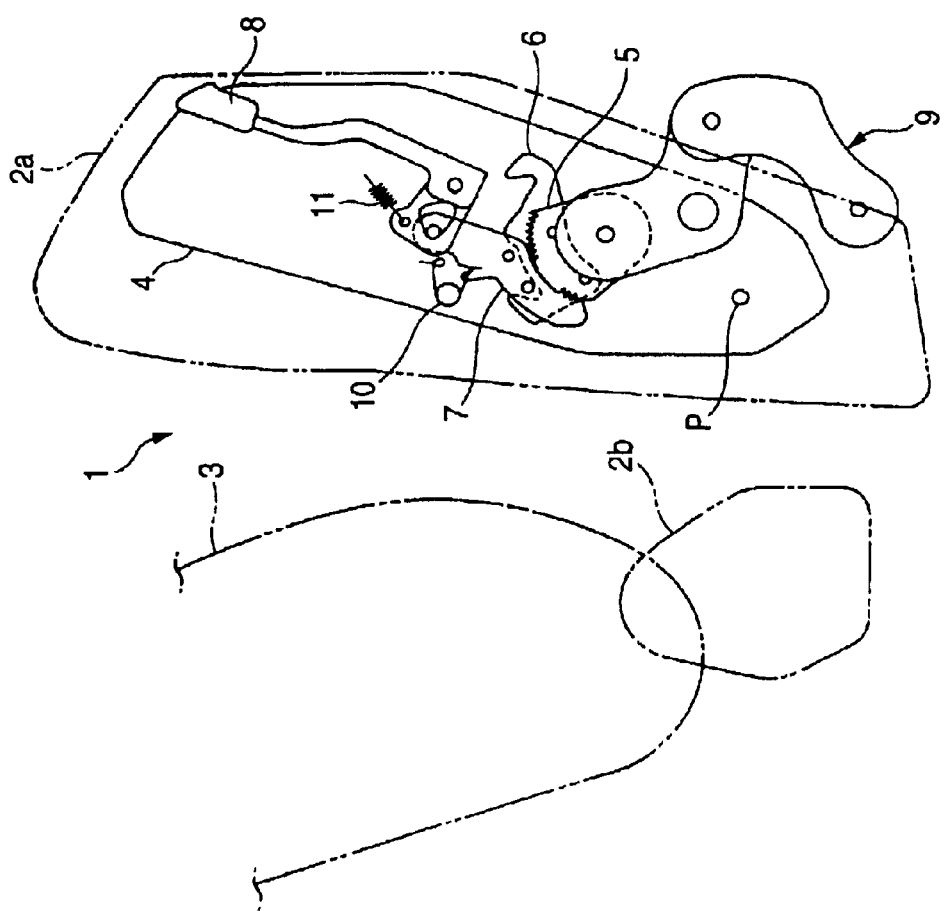
FIG. 7 is a view showing an action of a seat for vehicle use of an embodiment of the present invention.

When the seat cushion 2a is further rotated, the pin 7b of the rock gear 7 is guided by the groove 6b of the guide plate 6. Therefore, as shown in FIG. 7, the teeth 7c of the rock gear 7 are meshed with the teeth 5b for tip-up of the sector gear 5 (tip-up function).

Due to the above structure, the seat cushion 2a can be fixed at the tip-up position. When the whole seat 1 is slid forward, the volume of a baggage room can be extended, so that the property of loading baggage in the baggage room can be enhanced. In this connection, the sliding mechanism to slide the seat 1 is composed of a common structure. Therefore, explanations of the sliding mechanism are omitted here.

In the case where the tilt-up state and tip-up state are released, the rock gear 7 and the sector gear 5 are released from each other when the tip-up lever 8 is rotated, so that the seat cushion 2a can be returned to the seating position. When that the seat cushion 2a is returned to the seating position, the pin 7b of the rock gear 7 is guided by the groove 6c of the guide plate, so that the rock gear 7 and the sector gear 5 are meshed with each other. In this way, the seat cushion 2a can be held at the seating position.

Accordingly, the seat for vehicle use of an embodiment of the present invention is advantageous in that the front seat cushion 2a can be held at a predetermined position between the seating position and the tip-up position so that the thigh support function can be enhanced. It is possible to provide a seat having a tip-up function and tilt-up function while a simple structure such as one point hinge mechanism is being applied. Accordingly, it is possible to suppress an increase in the manufacturing cost by preventing an increase in the number of parts.

The rock mechanism (rock unit) composed of the sector gear 5 and rock gear 7 is arranged on the forward side of a vehicle with respect to rotary center P of the seat cushion 2a as shown in FIG. 2. Therefore, a load given to the rock mechanism can be suppressed.

According to the seating posture of a passenger, loads are inputted into various positions of the seat cushion 2a when the passenger is seated. For example, when the passenger is seated at the front portion of the seat cushion 2a and a load is given to the front end portion f (shown in FIG. 2) of the seat cushion 2a, a high intensity of moment is given to rotary center P. On the other hand, a relatively low intensity of moment is given to the above rock mechanism. Accordingly, when consideration is given to the above circumstances, it is possible to suppress a load given to the rock mechanism in a case in which the rock mechanism is arranged on the front side of rotary center P compared with a case in which the rock mechanism is arranged at rotary center P of the seat cushion 2a. As a result, the rock mechanism can be downsized and the weight can be reduced.

The rock gear 7 and sector gear 5 can be held in one of the releasing state or engaging state by the action of the spring 10. Therefore, the seat cushion 2a can be easily returned from the tip-up state or tilt-up state to the seating position.

When the seat cushion 2a is rotated to the tip-up position or seating position, the rock gear 7 can be automatically put into an engaging state by the two grooves 6b, 6c provided on the guide plate 6. Therefore, operation can be made simple and the device becomes convenient.

Figure 10:
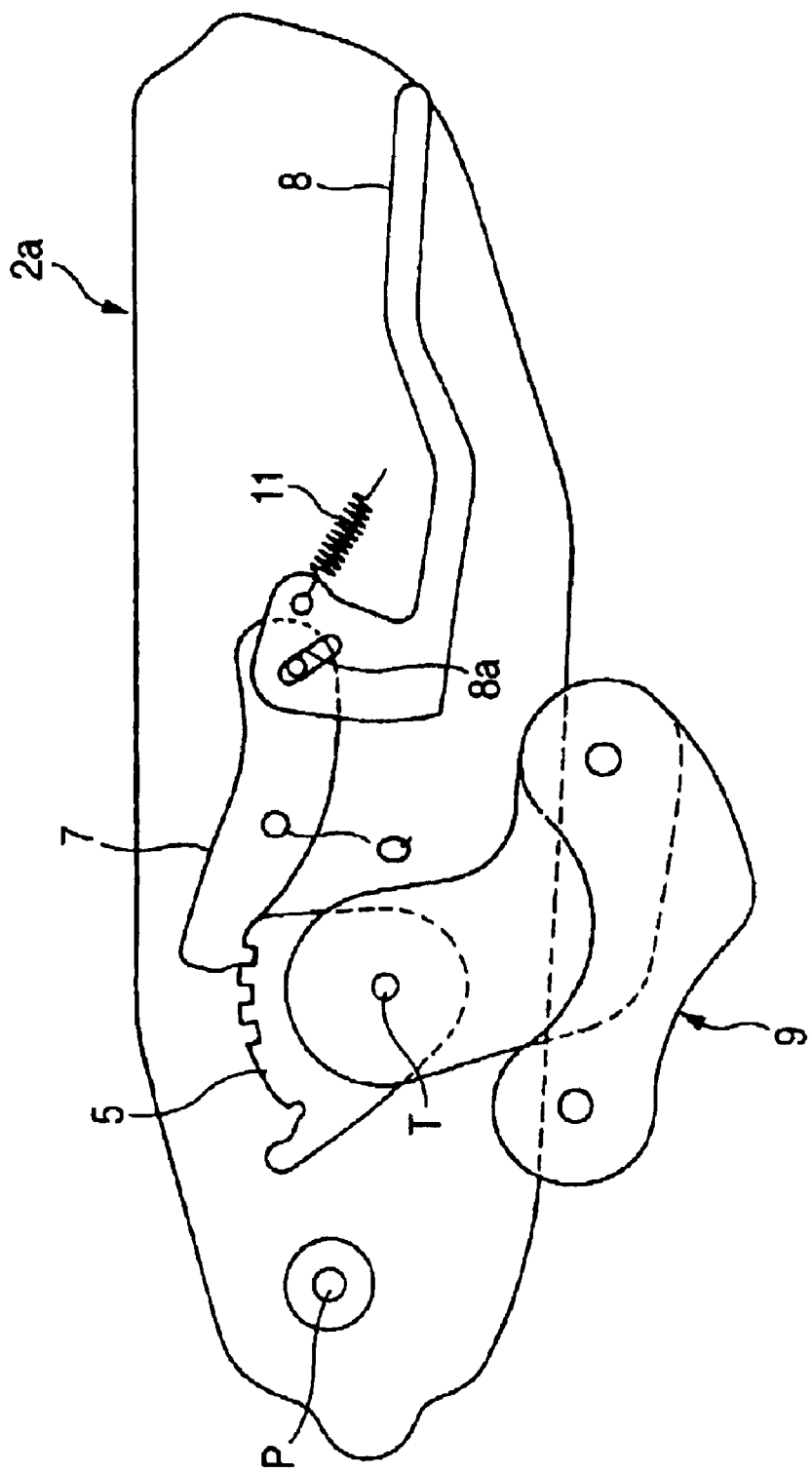
FIG. 10 is a schematic illustration showing a variation of a rock gear of a seat for vehicle use of an embodiment of the present invention.

In this connection, the seat for vehicle use of the present invention is not limited to the above specific constitution. It is possible to utilize variations while remaining within the gist of the invention and not deviating from its scope. For example, in the present embodiment, the rock gear and sector gear composing the rock unit are permitted to rotate in the direction of tipping up the seat cushion, and on the other hand the rock gear and sector gear composing the rock unit are restricted to rotate in the direction to the seating position. However, as shown in FIG. 10, the following structure may be adopted. A rotation of the seat cushion 2a in the direction of tipping up and a rotation of the seat cushion 2a in the direction to the seating position are regulated by the engagement of the rock gear with the sector gear, and when the tip-up lever is operated, the engagement is released. When the above structure is adopted, it becomes possible to prevent the occurrence of unintended tilt-up of the seat cushion 2a caused by misoperation conducted by a passenger.

As described above in detail, according to the seat for vehicle use of the present invention, there is provided a simple structure in which a rock unit for holding the seat cushion at at least one position between the base position and the tip-up position. By the above simple structure, it is possible to hold the seat cushion at a position desired by a passenger to be seated, and it is also possible to enhance the thigh support property of the passenger to be seated.

According to the seat for vehicle use of the present invention, the seat cushion is composed of a front seat cushion located in the front of a vehicle and a rear seat cushion arranged at the rear of the front seat cushion, and the tip-up unit is arranged in the front seat cushion. Therefore, a simple mechanism can be applied to the tip-up unit. Therefore, the seat cushion can be easily tipped up.

According to the seat for vehicle use of the present invention, the longest distance in the longitudinal direction of the vehicle from the tip-up unit to the rear end portion of the front seat cushion is shorter than the distance in the vertical direction of the vehicle from the tip-up unit to the floor of the vehicle. Due to the above structure, there is provided an advantage in which the rear end portion of the front seat cushion does not interfere with the vehicle floor in the case of tipping up the front seat cushion.

According to the seat for vehicle use of the present invention, the boundary between the front and the rear seat cushion is located in the neighborhood of a portion right below the lower end portion of the seat back on the front side. Due to the above structure, this boundary seldom interferes with the passenger's seating position. Therefore, the passenger feels no sense of incongruity and no comfortableness is hurt.

According to the seat for vehicle use of the present invention, the rock unit includes a first gear arranged in the front seat cushion and a second gear arranged so that the second gear can be meshed with the first gear, and the rock unit permits the seat cushion a tip-up motion to the tip-up position and on the other hand restricts the seat cushion not to tip down in the direction of the base position. Therefore, the front seat cushion can be positively held at a predetermined position.

According to the seat for vehicle use of the present invention, the rock unit is arranged in the front portion of a vehicle with respect to the tip-up unit. Due to the above structure, the rock unit is arranged at a position distant from the center of a load when a passenger is seated. Therefore, the passenger feels no sense of incongruity, and a load acting on the rock unit can be suppressed when the passenger is seated.

What is claimed is:

1. A seat for vehicle use comprising:
    a seat back;
    a seat cushion;
    a tip-up unit which tips up a forward end side of the seat cushion from a base position to an upward tip-up position; and
    a rock unit which holds the seat cushion at a plurality of discrete positions between the base position and the tip-up position to enhance a thigh support function.

2. The seat for vehicle use according to claim 1, wherein the seat cushion includes a front seat cushion positioned at a front side of a vehicle and a rear seat cushion positioned at the rear of the front seat cushion, the front seat cushion being provided with the tip-up unit.

3. The seat for vehicle use according to claim 2, wherein the front seat is rotatable about an axis of rotation, and a longest distance from the axis of rotation to a rearmost end portion of the front seat cushion is shorter than a vertical distance from a floor of the vehicle to the axis of rotation.

4. The seat for vehicle use according to claim 2, wherein a boundary between the front seat cushion and the rear seat cushion is located in the vicinity of a portion right below a lower end portion of a front side of the seat back.

5. The seat for vehicle use according to claim 2, wherein the rock unit permits a tip-up motion of the front seat cushion in a direction of the tip-up position and restricts a tip-down motion of the front seat cushion in a direction of the base position.

6. The seat for vehicle use according to claim 5, wherein the rock unit includes a first gear and a second gear, the second gear being fixed to the front seat cushion and movable along the first gear according to the tip-up motion of the front seat cushion while engaging with the first gear, and the first gear and the second gear being mutually engaged to restrict the tip-down motion of the front seat cushion.

7. The seat for vehicle use according to claim 5, wherein the rock unit is disposed at a position in the vehicle more forward than the position of the tip-up unit.

8. A seat for vehicle use according to claim 1, wherein the rock unit includes a first gear and a second gear, the second gear being fixed to the seat cushion and movable along the first gear according to a movement of the seat cushion from the base position to the upward tip-up position while engaging with the first gear at the plurality of discrete positions.

9. The seat for vehicle use according to claim 8, further including a disengagement unit for disengaging the first gear and the second gear.

* * * * *